(No Model.)　　　　　　　　　　　　　　　10 Sheets—Sheet 2.
D. A. PAGE & R. C. BIRD.
MACHINE FOR SIZING AND PAINTING CLOTH.

No. 402,184.　　　　　　　　　Patented Apr. 30, 1889.

(No Model.) 10 Sheets—Sheet 5.
D. A. PAGE & R. C. BIRD.
MACHINE FOR SIZING AND PAINTING CLOTH.

No. 402,184. Patented Apr. 30, 1889.

(No Model.)  
10 Sheets—Sheet 6.

D. A. PAGE & R. C. BIRD.
MACHINE FOR SIZING AND PAINTING CLOTH.

No. 402,184.  
Patented Apr. 30, 1889.

(No Model.) 10 Sheets—Sheet 7.
D. A. PAGE & R. C. BIRD.
MACHINE FOR SIZING AND PAINTING CLOTH.

No. 402,184. Patented Apr. 30, 1889.

(No Model.) 10 Sheets—Sheet 8.
D. A. PAGE & R. C. BIRD.
MACHINE FOR SIZING AND PAINTING CLOTH.

No. 402,184. Patented Apr. 30, 1889.

Witnesses:
K. C. McArthur
W. Rossiter

Inventors:
Dunstan A. Page
Richard C. Bird
per
H. Harrison
Attorney.

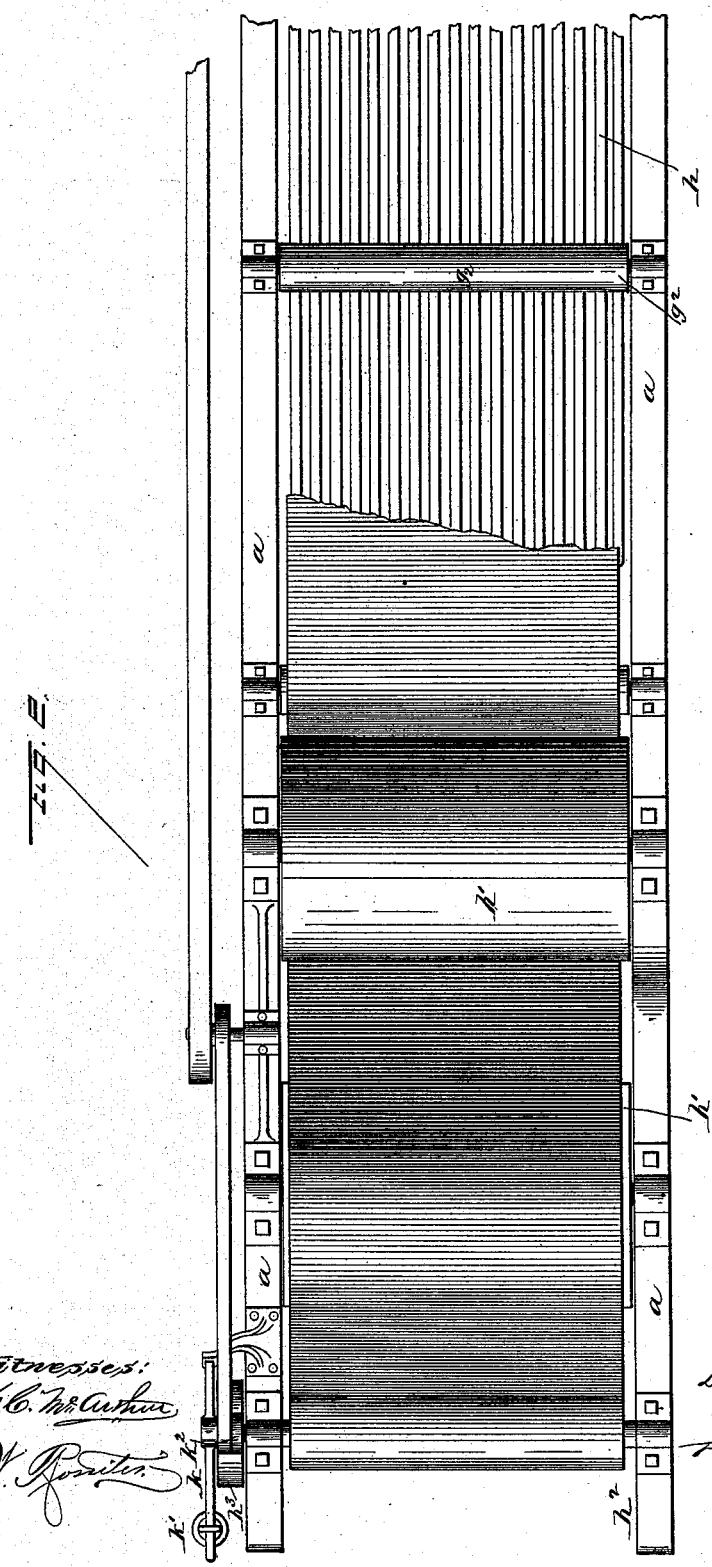

(No Model.)
10 Sheets—Sheet 10.
D. A. PAGE & R. C. BIRD.
MACHINE FOR SIZING AND PAINTING CLOTH.
No. 402,184. Patented Apr. 30, 1889.
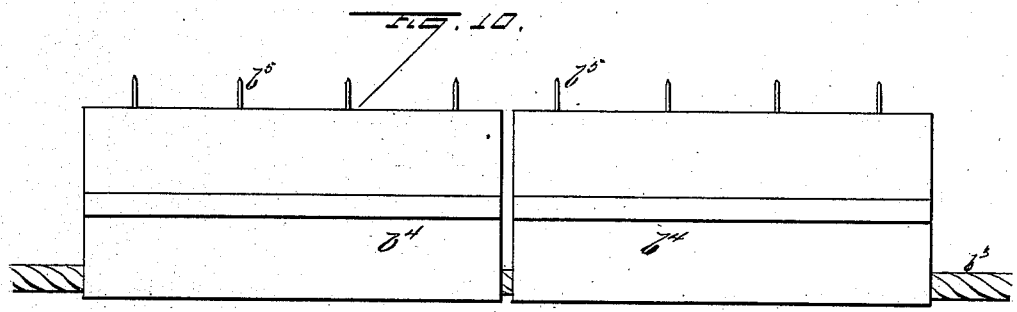
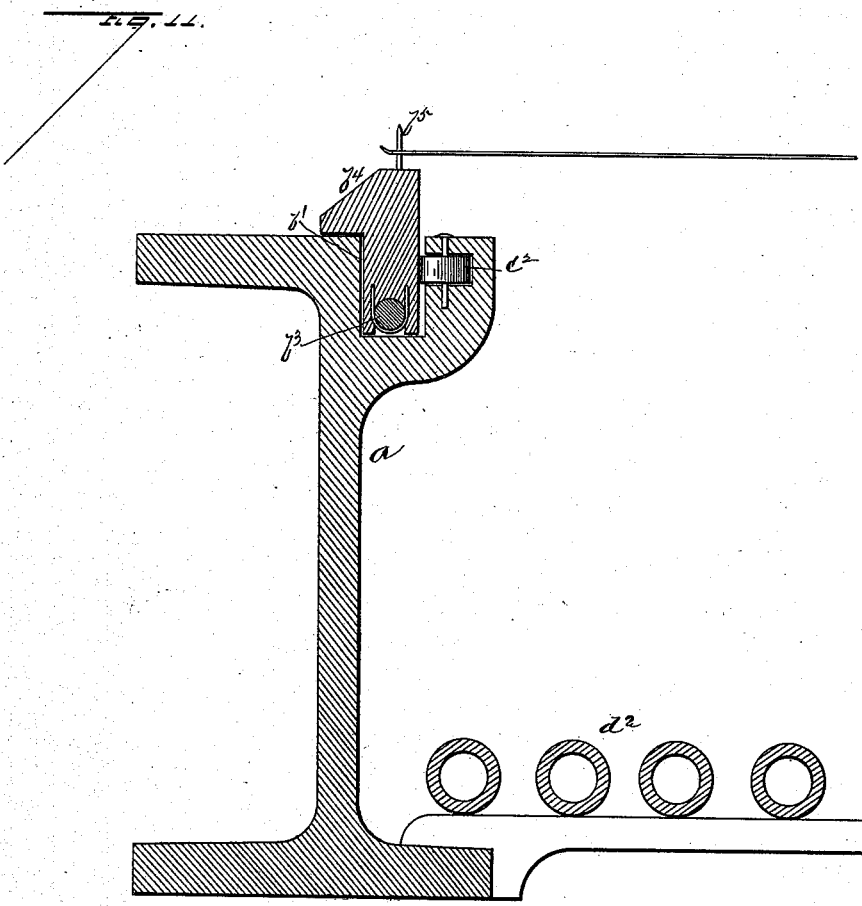
Witnesses:
Inventors:
Dunstan A. Page
Richard C. Bird
per
H Harrison
Attorney.

UNITED STATES PATENT OFFICE.

DUSTAN A. PAGE AND RICHARD C. BIRD, OF CHICAGO, ILLINOIS, ASSIGNORS TO THE CALUMET SHADE CLOTH COMPANY, OF SAME PLACE.

MACHINE FOR SIZING AND PAINTING CLOTH.

SPECIFICATION forming part of Letters Patent No. 402,184, dated April 30, 1889.

Application filed March 30, 1888. Serial No. 268,911. (No model.)

*To all whom it may concern:*

Be it known that we, DUSTAN A. PAGE and RICHARD C. BIRD, citizens of the United States, residing at Chicago, in the county of Cook and State of Illinois, have invented certain new and useful Improvements in Machines for Sizing and Painting Cloth, of which the following is a specification, to wit:

This invention relates to an improvement in machines for making window-curtains; and it consists in certain peculiarities of the construction and arrangement of the same, whereby the cloth is taken from a roll at one end of the machine, sized upon both sides, thoroughly dried, painted upon both sides, again dried, and finally rolled up at the opposite end of the machine, all at one operation, substantially as will be hereinafter more fully set forth, and specifically pointed out in the claims.

In order to enable others skilled in the art to which our invention pertains to make and use the same, we will now proceed to describe its construction and operation, referring to the accompanying drawings, in which—

Figure 1:
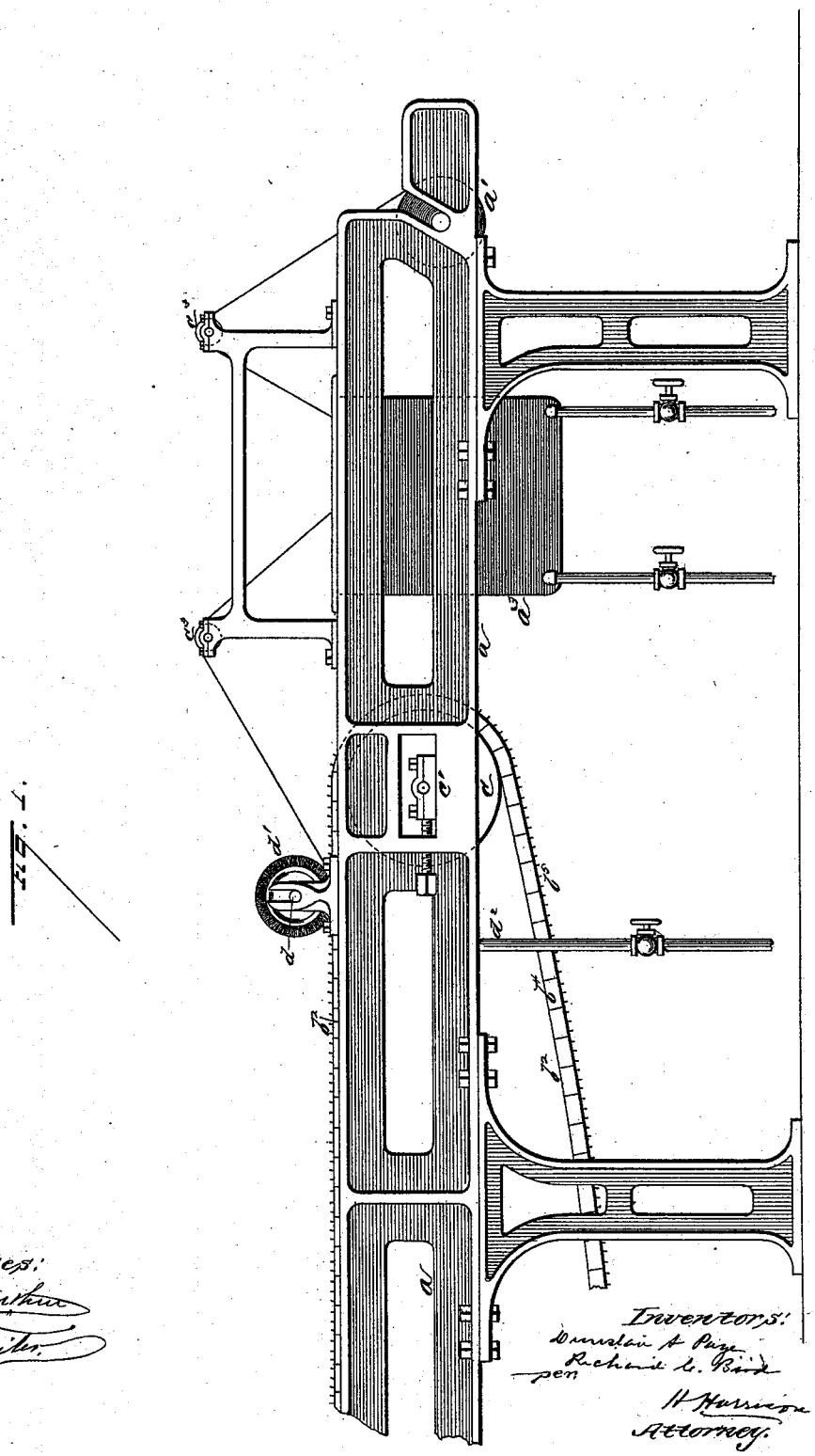
Figure 2:
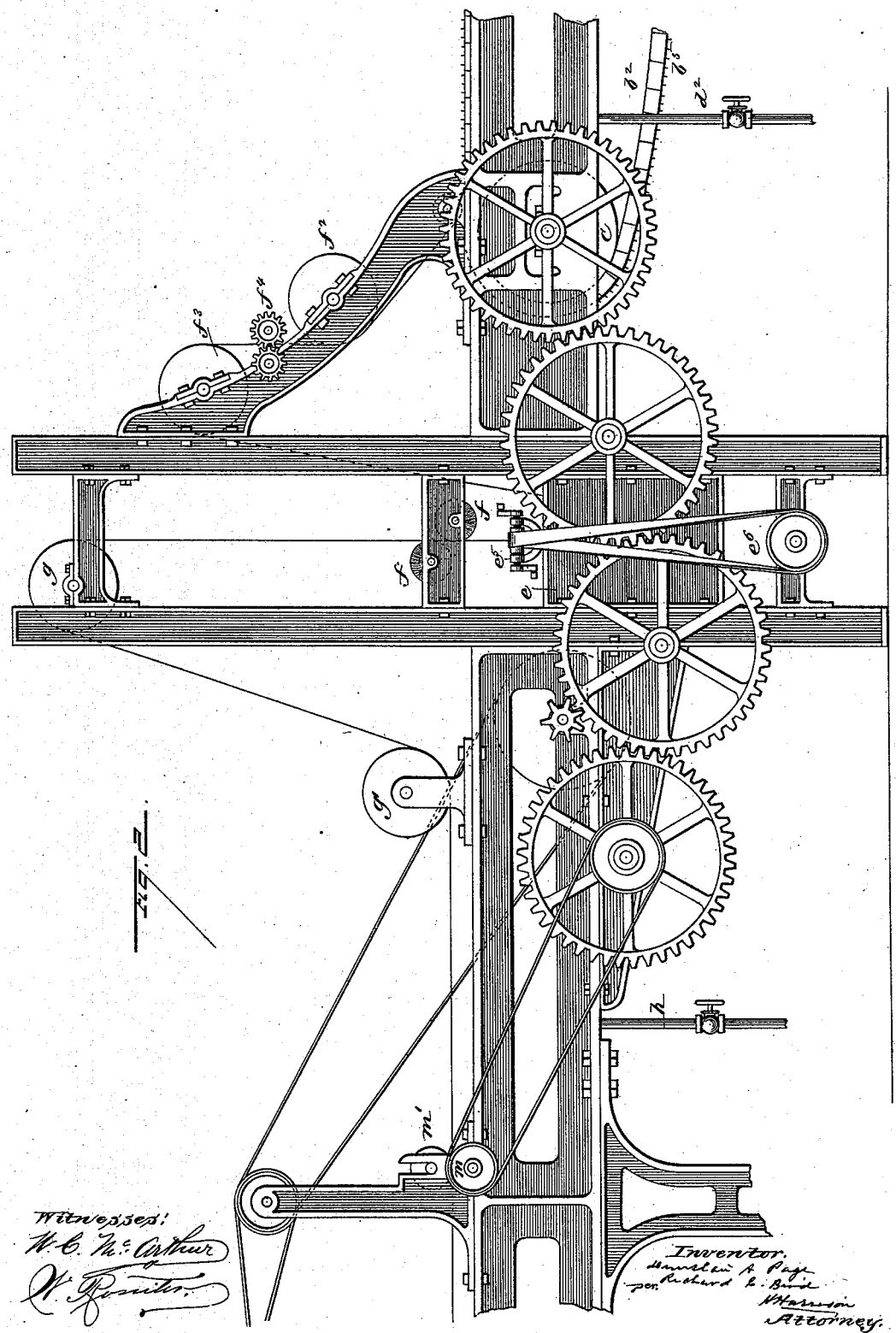
Figure 3:
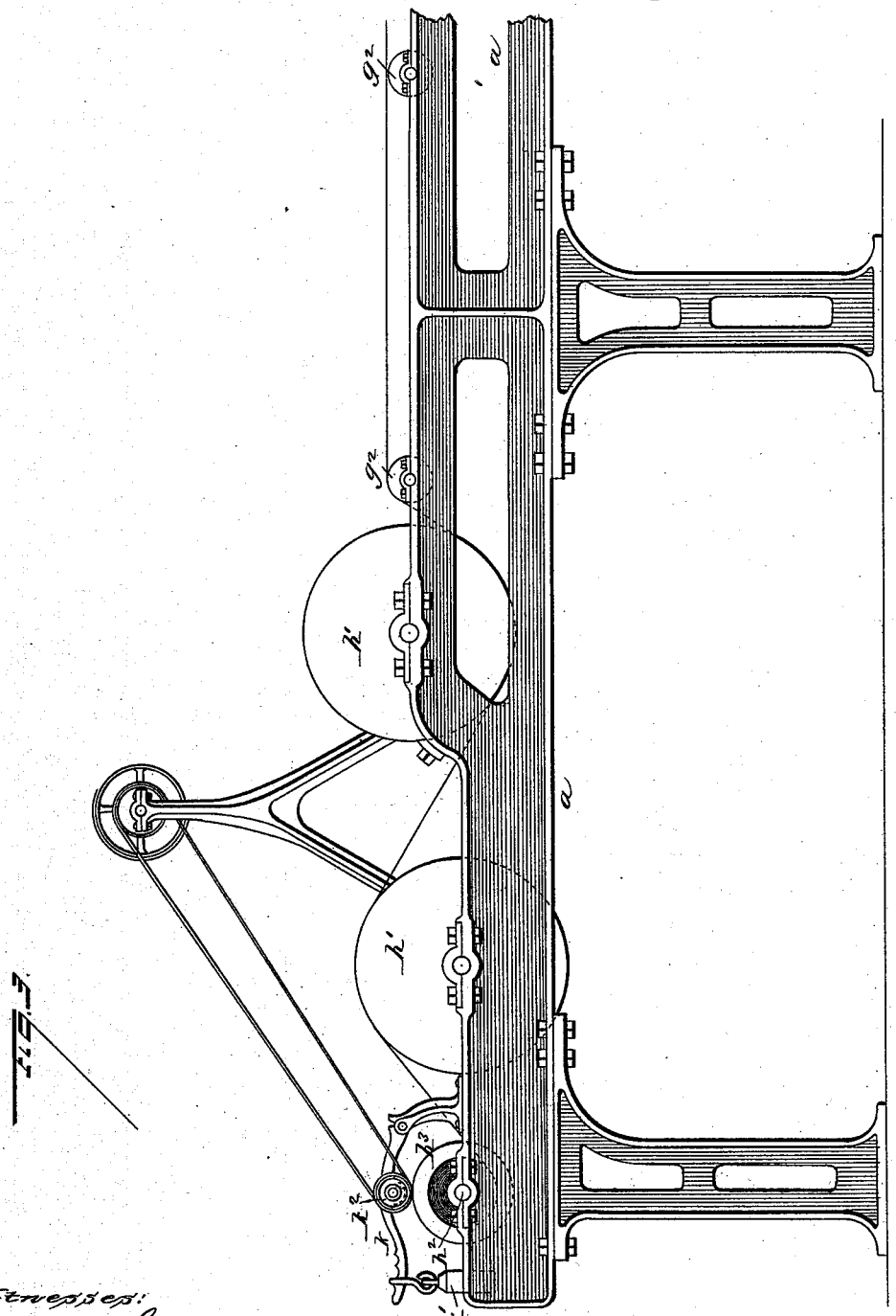
Figure 4:
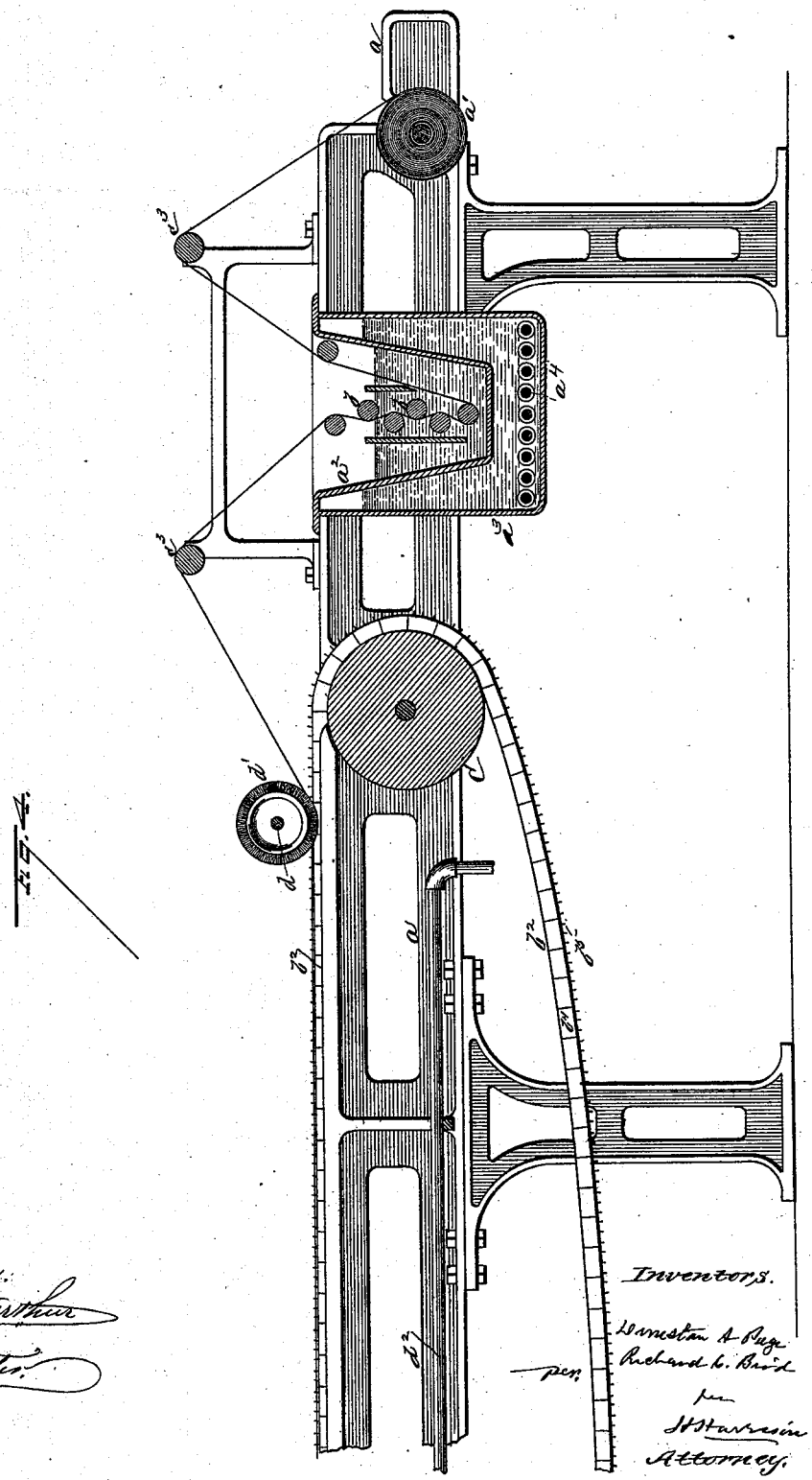
Figure 5:
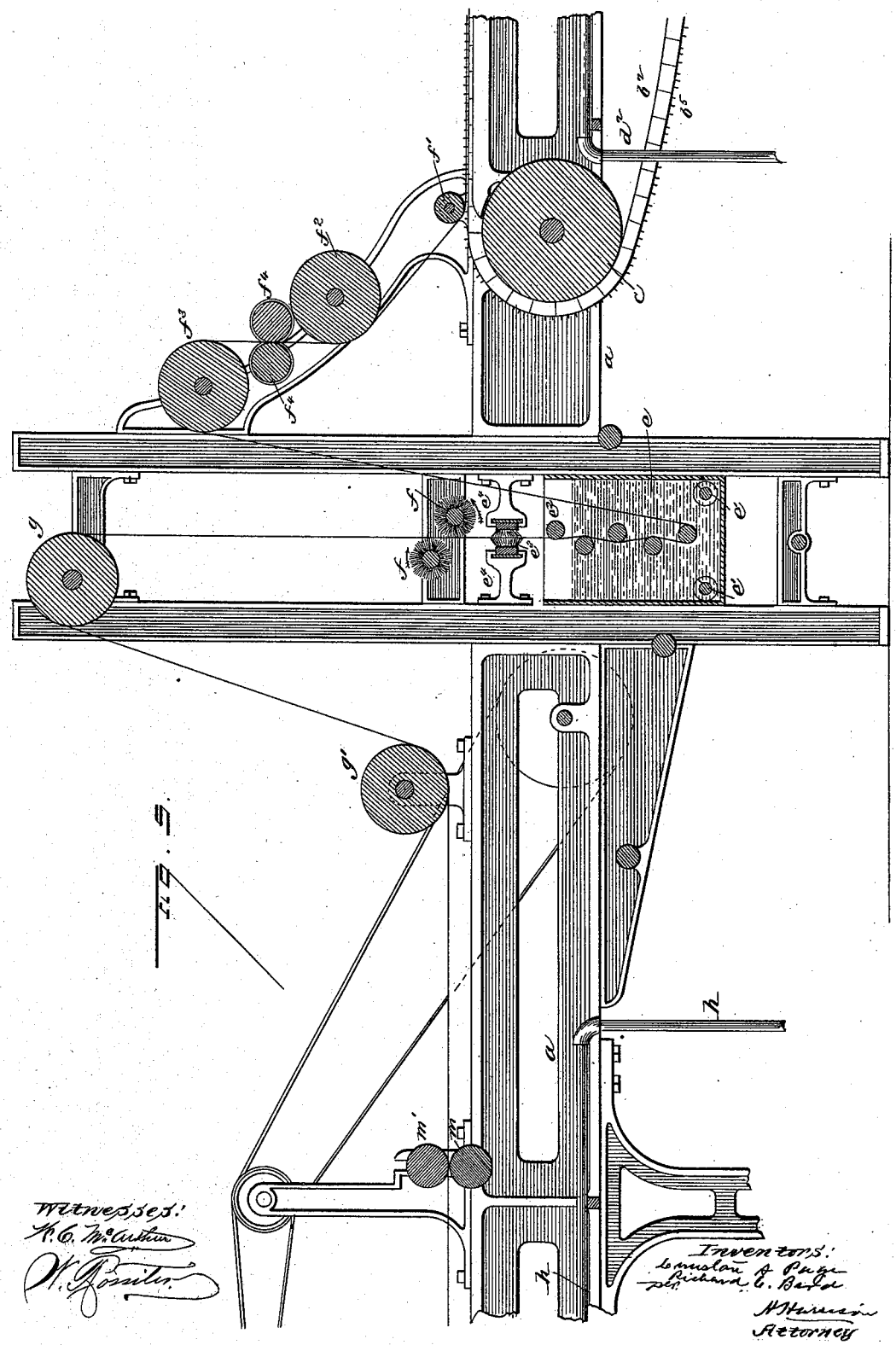
Figure 6:
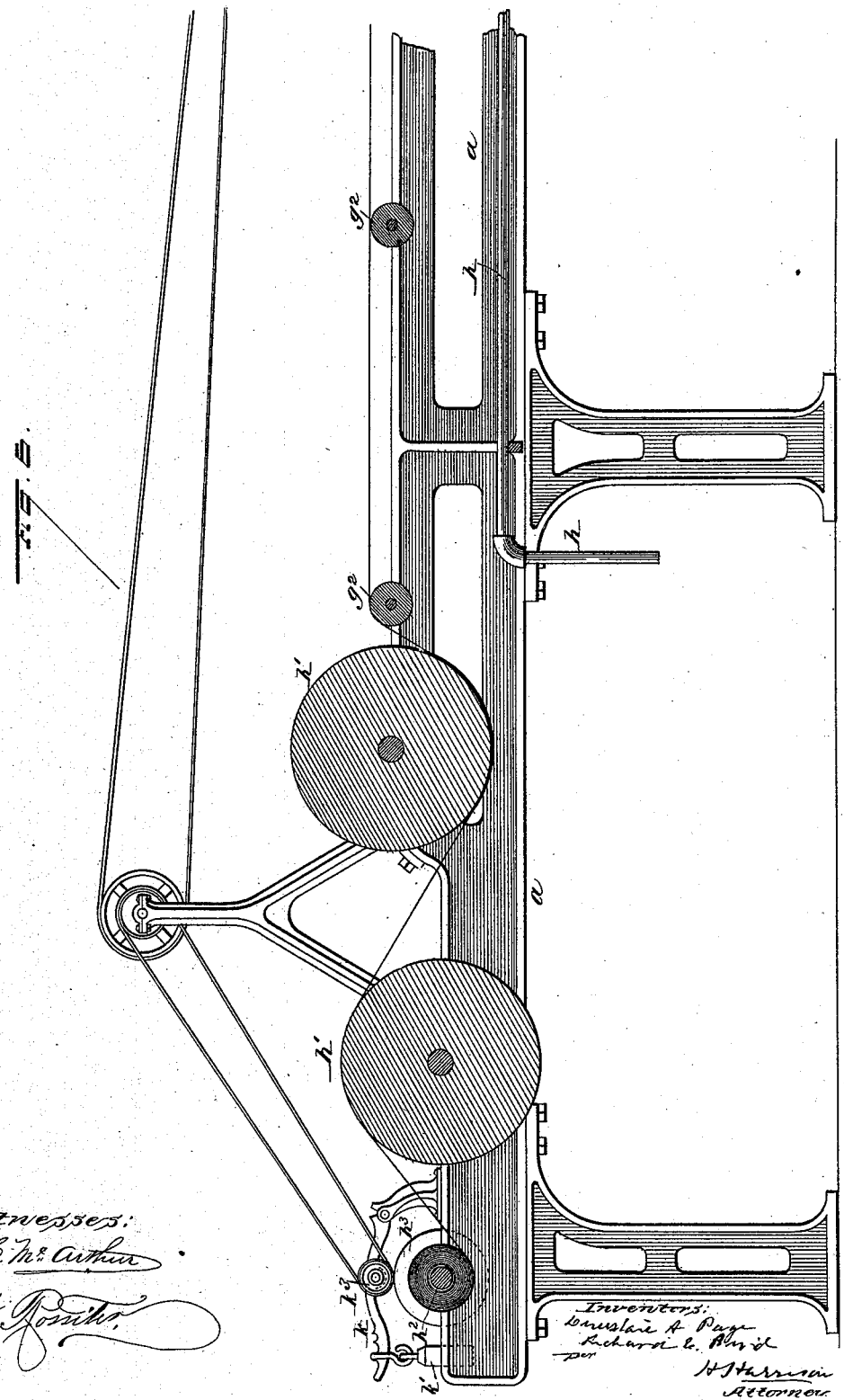
Figure 7:
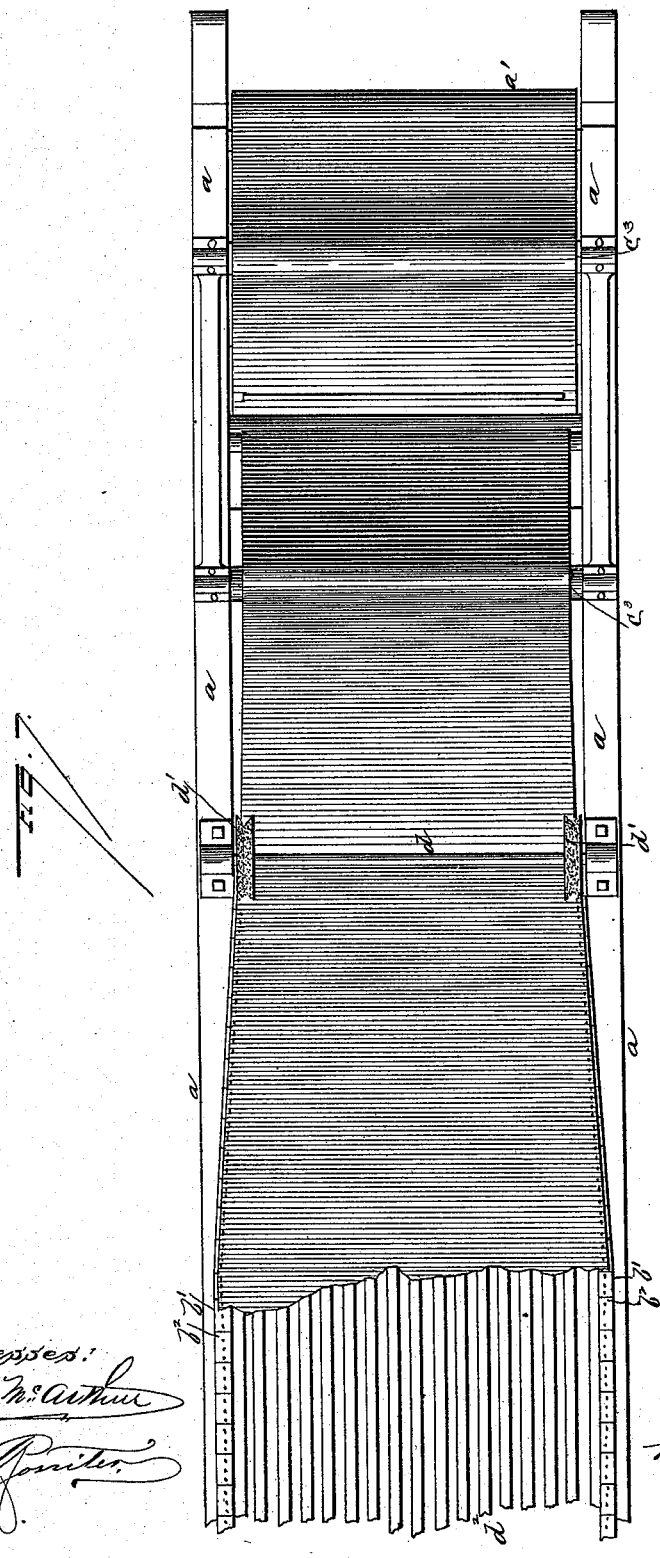
Figure 8:
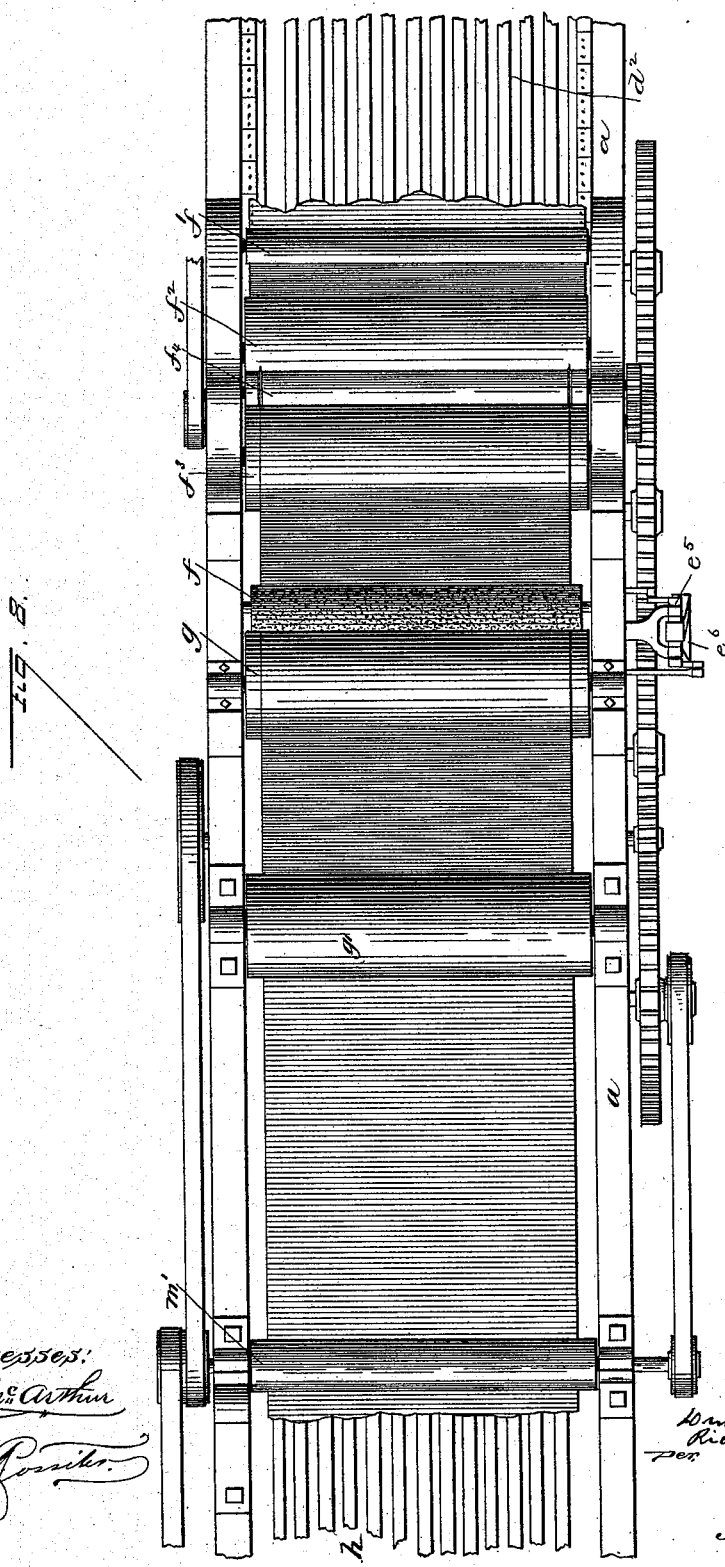

Figures 1, 2, and 3, taken together, represent a side elevation of our machine. Figs. 4, 5, and 6 represent in like manner a vertical longitudinal section of the machine. Figs. 7, 8, and 9 show a top plan view, with, in some parts, the web of cloth broken away to expose the steam-coils beneath them. Fig. 10 is a side elevation of a section of one of the endless carriers; and Fig. 11 is an enlarged cross-section of one of the side frames, showing the carrier and a portion of the steam-coil in proper relative position.

$a$ represents the main frame of our machine, which is of course made of any material and in any size and form deemed most suitable to the work to be done.

At the head of the machine, as seen in Figs. 1 and 4, is located the roll $a'$, from which the material to be treated is drawn in a continuous web or sheet and passed through the machine. This roll is journaled in the frame in any convenient way, so it may be readily removed and replaced, and adjacent thereto is properly supported in the frame the sizing tank or receptacle $a^2$. This tank is made of proper size and form to hold the proper quantity of the sizing, which must be applied to the cloth before it can be properly painted. As clearly seen in Fig. 4, the sizing-tank is jacketed or surrounded by a casing, $a^3$, in which is placed a quantity of water, as shown in the drawings, and in the bottom of the jacket we place a coil of pipe, $a^4$, provided with proper supply and exhaust connections. Through this coil steam is circulated, and the consequent heating of the water warms the sizing-tank and prevents the contents of the latter from thickening up, but always retains it in a proper state for application to the cloth.

Within the sizing-tank is arranged a series of rollers, $b$, around and between which the web of cloth is passed, and which serve to press the sizing into the fabric and equally distribute it over both surfaces, as also to prevent too great a quantity of sizing from being used.

The main frame of the machine is on each side, on its upper face, formed with a guide-groove, $b'$, extending longitudinally, in each of which grooves is placed the upper part of an endless carrier, $b^2$. The construction of this carrier will be best shown in Figs. 10 and 11, in which it is seen that upon an endless rope or cable, $b^3$, are secured a series of short blocks, $b^4$, provided with projecting pins $b^5$ on their outer face. The cable, preferably of steel, is recessed in the under faces of the blocks, which are placed close together, and the whole forms a carrier-belt which travels forward in the guide-grooves of the frame, these serving to hold the two belts always in the same relative position while they are performing the work under operation. At each end of the belts they run over suitable transverse rolls, $c$, in the main frame, one or both of which are provided with movable journal-boxes, as at $c'$, in order that sufficient tension may always be had to move the belts positively and in unison, and this movement is greatly facilitated by a series of small friction-rollers, $c^2$, set in the sides of the guide-grooves of the frame, as clearly seen in Fig. 11.

In stretching many kinds of cloth, and particularly where the cloth is of great width, much force is required, and the parts of the machine must be strong and rigid in order that the force may be advantageously applied. We have found it very desirable to form the grooves by which the blocks carrying the tenter-pins are separated and the cloth stretched directly in the rigid frame of the machine, as thereby all tendency to looseness of parts or varying and uncertain adjustments is avoided.

From the roll upon which it is wound the cloth is passed over a guide-roller, $c^3$, suitably journaled above the frame, and is thence passed down to the bottom of the sizing-tank and up again, zigzagged around and between the series of rollers therein, which act, as before described, in the proper application and distribution of the sizing, thence over another elevated guide-roller, and is then carried down to the carrier-belts. A shaft, $d$, across the machine above the belts, is provided with a pair of disks or wheels, $d'$, which have soft or elastic faces made in any suitable way, but shown herein as formed similar to a brush. The soft faces of these disks run over the upper faces of the spiked carrier-belts and press the edges of the cloth down over the pins, so that the belts have a positive and certain hold upon the cloth to hold it in a rigid horizontal position without wrinkles and carry it forward bodily. By reference to Fig. 7 it will be noted that for a short distance from the point where the endless carrier-belts enter them the guide-grooves in the frame incline outwardly and then run forward parallel. The reason for this is that when the cloth is wet with the sizing it shrinks, and after its engagement with the carriers the latter are spread apart by their grooves to stretch the material and enable it to dry properly.

In the frame or between the side frames, $a$, beneath the cloth as it lies upon the carrier-belts, we place a coil of steam-pipe, $d^2$, of course provided with suitable inlet and outlet connections, and through this coil is circulated live steam, the heat from which rises and rapidly dries the cloth as it is carried along, so that when it arrives at the opposite end of the coil at the point seen in Figs. 2 and 5 it is thoroughly dry. The distance required for this purpose is naturally greater than the proportion seen in Figs. 1 and 2; but as this intermediate part of the machine is exactly like the ends herein shown the illustrations will be quite sufficient to enable any one to clearly comprehend it.

At or near the center of the machine, as seen in Figs. 2 and 5, is located the paint-tank $e$, of proper size and form, and in the lower part of this tank are placed a pair of spiral agitators, which are in constant motion, and serve to prevent the liquid paint from settling. This is seen at $e'$ in Fig. 5. The paint box or tank is also provided with a vertical series of rollers, $e^2$, over and around which the web of sized material is carried, and which serve, as in the similar case of the sizing-rollers, to more equally distribute the paint upon both sides of the material as it is drawn through the tank. Just above the tank is a pair of flat-faced brushes, $e^3$, extended transversely of the machine, and having an endwise reciprocation in guides $e^4$ by connection to the cranked shaft $e^5$, held in suitable brackets upon one side of the main frame, and which is operated by being belted to an adjacent pulley, as in Figs. 2 and 8, at $e^6$.

Above the flat reciprocating brushes we again arrange a pair of cylindrical ones, $f$, which run toward each other, as indicated by the arrows, and the material as it leaves the tank is carried up between the faces of the reciprocating and then of the revolving brushes, and their combined action not only distributes the paint and rubs it in with perfect equality over the whole of both surfaces of the material, but they effectually remove all surplus color, which drops back into the tank.

As will be noted in Fig. 5, at the point where the web of cloth leaves the carrier a small roller, $f'$, is placed, under which the material is carried to prevent its being pulled off the pins of the carriers too soon. From this point the material, now thoroughly dried, is carried up around a pair of rolls, $f^2 f^3$, and between a pair of trimming-rolls, $f^4$, which are provided with circular knives, and trim the edges of the web to proper size. The cloth is next passed down into the paint-tank and around the vertical series of rollers therein, and then passes straight up between the faces of the reciprocating and revolving brushes to and over a roll, $g$, journaled at a considerable height, so that the color may have sufficient time to set before contacting with this roll, to prevent any injury to its appearance by such contact. From this elevated guide-roll the material is again brought down and beneath a roll, $g'$, and is thence carried along horizontally over a series of supporting-rollers, $g^2$, to the foot of the machine. Beneath this horizontal part of the material is also placed a steam-coil, $h$, provided with the usual connections, and it is of sufficient length to thoroughly dry the painted cloth before it arrives at the end of the machine, as in Figs. 3 and 6. At the foot of the machine we provide a pair of large rolls, $h' h'$, over and under which the material is led to smooth it out thoroughly, and it is finally wound in its finished state upon a shaft, $h^2$, journaled in the main frame and provided on one end with a friction-pulley, $h^3$.

Hinged to a bracket-arm on an adjacent part of the frame is an arm, $k$, provided with an adjustable weight, $k'$, and also with a small friction-pulley, $k^2$, which rests upon and drives the pulley $h^3$, and is itself driven by a belt from any convenient part of the machine. This arrangement of friction-pulleys serves the twofold purpose of drawing the material through the machine from the time it is disengaged from the spiked carrier-belts and reeling it up on the shaft $h^2$, but also allows for a slip of the parts, which is essential, as the size of the reeled material slowly increases, so that the web will not be injured by any tendency to pass it through the tail of the machine faster than the carrier-belts will supply it. To take a portion of the strain of pulling the cloth and relieve the reeling-shaft of a portion of its strain, we use a pair of rolls, $m\ m'$, as in Figs. 2 and 5, one of which is driven from the adjacent shafting and the other rests loosely upon it, and the cloth passing between these rolls is drawn along at the same speed given the carrier-belts upon the other end of the machine, this being readily regulated by well-known mechanical means.

It will be noted in Figs. 2 and 8 that a series of gears are used to connect the mechanism of the two ends of the machine; but this particular construction is not at all material to our invention and may be altered as dictated by experience and the proper adaptation of the machine to particular work.

We do not desire to be confined to the location of the trimming-rolls at the particular point herein shown, as it is quite evident they may be placed at other points on the machine with equal effect.

In the illustrations herewith we have shown the guide-grooves for the endless carrier-belts as formed in the side pieces of the main frame, and this will be found the most convenient mode in machines intended to work but one width of material.

From the foregoing description it will be seen that the cloth is sized upon both sides, dried, painted upon both sides, and again dried in one operation and at one continuous passage through the machine, requiring no extra handling, and producing a product equal in every respect to hand-made goods, which will not crack, is perfectly flexible, of an even texture and color, and which will not roll at the edges when hung in place upon a window. This is an important consideration, as besides the economy of performing the whole work at one operation the qualtity of the goods is raised to an equality with the best hand-made articles, which has not heretofore been possible in machine-goods.

Having thus fully described our invention, what we claim as new, and desire to secure by Letters Patent, is—

1. In a cloth-sizing machine, the combination, with the main frame and the sizing apparatus, of the carrier-belts, each consisting of a cable and a series of short spiked sections recessed upon their under sides, in which recesses are secured the cables, and grooved guides in which the said belts run, substantially as described.

2. In a machine for painting or sizing cloth, the combination, with the tank and the positive cloth-feeding devices which engage with the cloth after leaving the tank, of a winding shaft or drum for the finished cloth, provided at its end with a friction-pulley, $h^3$, a friction driving-wheel, $k^2$, engaging with the pulley, a hinged arm in which the said pulley is mounted, and a weight adjustable upon the said arm, substantially as described.

3. In a machine for sizing and painting cloth, the combination of the main frame, the size-tank, the positive cloth moving and stretching belts engaging with the cloth after leaving the tank, the paint-tank, the spreading-brushes, the friction driving-wheel, and the friction-driven winding-shaft for receiving the cloth after leaving the painting device, substantially as set forth.

In testimony whereof we affix our signatures in presence of two witnesses.

DUSTAN A. PAGE,
RICHARD C. BIRD.

Witnesses:
W. C. McARTHUR,
CHAS. C. TILLMAN.